US008428153B2

(12) United States Patent
Burns et al.

(10) Patent No.: US 8,428,153 B2
(45) Date of Patent: Apr. 23, 2013

(54) SIGNAL AND DEVICES FOR WIRED NETWORKS

(75) Inventors: Danny Burns, Bury St. Edmonds (GB); Steve Farmer, Sandy (GB)

(73) Assignee: Apollo Fire Detectors Limited, Havant, Hampshire (GB)

( * ) Notice: Subject to any disclaimer, the term of this patent is extended or adjusted under 35 U.S.C. 154(b) by 283 days.

(21) Appl. No.: 12/863,815

(22) PCT Filed: Feb. 11, 2009

(86) PCT No.: PCT/GB2009/000385
§ 371 (c)(1),
(2), (4) Date: Oct. 12, 2010

(87) PCT Pub. No.: WO2009/101404
PCT Pub. Date: Aug. 20, 2009

(65) Prior Publication Data
US 2011/0019748 A1    Jan. 27, 2011

(30) Foreign Application Priority Data
Feb. 11, 2008    (GB) .................................. 0802502.5

(51) Int. Cl.
*H04B 14/04* (2006.01)
(52) U.S. Cl.
USPC .......................................... 375/242; 375/238
(58) Field of Classification Search .................. 375/242, 375/238
See application file for complete search history.

(56) References Cited

U.S. PATENT DOCUMENTS

| 4,692,750 | A | 9/1987 | Murakami et al. |
| 6,091,779 | A | 7/2000 | Griessbach |
| 7,701,355 | B1* | 4/2010 | Billman ........................ 340/628 |
| 2002/0024424 | A1 | 2/2002 | Burns et al. |
| 2003/0222587 | A1* | 12/2003 | Dowling et al. ............... 315/149 |
| 2006/0064037 | A1* | 3/2006 | Shalon et al. .................. 600/586 |

FOREIGN PATENT DOCUMENTS

| DE | 3110229 A1 | 9/1982 |
| EP | 0362985 A1 | 4/1990 |
| EP | 901111 A2 | 3/1999 |
| GB | 2062384 A | 5/1981 |
| GB | 2082813 A | 3/1982 |
| GB | 2178878 A | 2/1987 |

(Continued)

OTHER PUBLICATIONS

PCT Search Report and Written Opinion for PCT/GB2009/000385, dated May 27, 2009, 14 pages.

(Continued)

*Primary Examiner* — Shuwang Liu
*Assistant Examiner* — Michael Neff
(74) *Attorney, Agent, or Firm* — Michael Best & Friedrich LLP

(57) ABSTRACT

A signal for use on a wired network interconnecting electronic devices, comprising: a base voltage for conveying power to the electronic devices; a pulsed voltage signal bearing coded information for transfer between the electronic devices; and a digital signal superimposed onto selected portions of the pulsed voltage signal, wherein the digital signal comprises a carrier signal modulated by a data signal for transfer between the electronic devices. This is used in fire alarm networks, for example, to convey multimedia or other data such as control signals, whilst maintaining compatibility with existing protocols using the pulsed voltage signal.

12 Claims, 6 Drawing Sheets

FOREIGN PATENT DOCUMENTS

| | | | |
|---|---|---|---|
| GB | 2211685 | A | 7/1989 |
| GB | 2289583 | A | 11/1995 |
| JP | 9110377 | A | 4/1997 |
| WO | 9600430 | A1 | 1/1996 |
| WO | 0131806 | A1 | 5/2001 |

OTHER PUBLICATIONS

UK Search Report under Section 17(6) of GB0802502.5, dated Oct. 24, 2008, 3 pages.
UK Search Report under Section 17(5) of GB0802502.5, dated May 22, 2008, 4 pages.

* cited by examiner

SIGNAL AND DEVICES FOR WIRED NETWORKS

CROSS-REFERENCE TO RELATED APPLICATIONS

This patent application is a national stage filing under 35 U.S.C. 371 of International Application No. PCT/GB2009/000385, filed 11 Feb. 2009, which claims foreign priority to Great Britain Patent Application No. 0802502.5, filed 11 Feb. 2008, each of which is incorporated herein in its entirety. Priority is hereby claimed to each of these applications.

The invention is in signal compositions for use on wired networks and in electronic devices for use on such networks, as well as in related methods of operation. It is especially but not exclusively applicable to fire alarm systems with sounders and detectors (or combined sounder/detectors) linked by a common network cable, e.g. a fireproof cable to a control panel.

BACKGROUND OF THE INVENTION

In known fire alarm systems, fire detectors are distributed throughout a building, the fire detectors being networked together and monitored by a central controller. Monitoring the fire detectors involves transmitting a sequence of polling signals to each detector and receiving signals indicating the status of the detector. If the presence of a fire is detected then the central controller can transmit a signal to alarm sounders located at various points around the building. Such a system is disclosed in our GB-A-2178878 which is incorporated by reference herein.

The sounders emit an audible warning such as a high pitched tone or siren, indicative of the need to evacuate the building. A more specific audible warning, such as a verbal command to evacuate the building or part of the building, can also be generated. A number of voice messages may be pre-recorded and stored in a memory of the sounder, which can be triggered by the signal from the central controller. A disadvantage is that customising the system to suit a particular environment is difficult because the voice messages are pre-programmed and can only be accessed from an interface at the sounder.

It is desirable to include a voice communication capability in a building for fire-fighters to communicate to each other or to other occupants within the building. It is known to provide public address systems in a building for such a purpose. However, existing public address and intercom systems are discrete audio products, separate from any fire alarm systems. The public address system and fire alarm system therefore require separate installation and operation.

Where fire detectors and sounders draw power from the network which is usual, power conservation is an important consideration, particularly during an alarm condition when many devices are drawing power from the network simultaneously.

A further consideration in introducing extra functionality into fire alarm systems or other installations is backwards compatibility. It is desirable to allow existing equipment, which recognises existing transmission protocols, to function without the need for replacement.

SUMMARY OF THE INVENTION

The invention provides a signal for use on a wired network interconnecting electronic devices, comprising:

a base voltage for conveying power to the electronic devices;

a pulsed voltage signal bearing coded information for transfer between the electronic devices;

and a digital signal superimposed onto selected portions of the pulsed voltage signal, wherein the digital signal comprises a carrier signal modulated by a data signal for transfer between the electronic devices.

This allows for more rapid transfer of information reliably over an existing pulsed voltage signal protocol, such as in fire alarm networks. The digital signal will be at a substantially higher frequency than that of the pulsed voltage signal. In addition, as illustrated below, there may also be superimposed a current signal, causing a superimposed pulsed voltage signal, travelling in the opposite direction from the said signal in a bidirectional network.

The invention also provides a computer-readable medium storing a computer program which, when loaded in an electronic device, causes that device to generate or process a signal, in accordance with the above-defined invention, that is transmitted from or received by that device.

The invention also provides a wired network interconnecting electronic devices, wherein the electronic devices are configured to transmit and/or receive a signal according to the invention.

The invention also provides an electronic device configured for communication with other electronic devices over a network as defined above, the device comprising means for generating and/or for processing a signal as defined above, and means for drawing operating power from that signal.

Such a device may be a sounder or loudspeaker device, or an interface device e.g. a voice communications terminal such as a fire telephone, EVC outstation or call point, a detector device or a network control device.

The invention also provides a fire detector apparatus comprising:

detector means arranged to detect a change in at least one external condition, transducer means arranged to generate an audible sound, a microphone arranged to monitor the external sound level generated by the transducer means, and control means arranged to adjust the sound level of the transducer means in dependence on the external sound level sensed by the microphone.

This saves power consumption and is particularly advantageous when the device draws its power from the signal on the network.

The invention also provides a method of operating a sounder or loudspeaker device according to the invention, wherein the data signal comprises audio, comprising receiving the said signal from the network said signal comprising control data and multimedia data combined together, separating the control data from the multimedia data, storing the multimedia data in the memory, and outputting the multimedia data from the memory to a transducer.

The invention also provides a method of uploading an audio voice file from a network control device according to the invention to a plurality of networked devices each according to the invention, comprising;

inputting an audio voice file into the network control device;

storing the audio voice file in the memory of the network control device, retrieving the audio file from the memory, combining the audio voice file with control data, transmitting the audio voice file and control data within the said signal to at least one of the networked devices, receiving the audio voice file and control data at the networked device or devices and storing the audio voice file in the memory of the device or devices.

The invention also provides a method of operating a network according to the invention, including the further steps of monitoring by the plurality of detector devices at least one external condition in order to determine the presence of a fire, and generating an alarm signal at least one of the sounder or loudspeaker devices if the presence of a fire is detected.

The invention also provides a method of operating such a network, comprising receiving a voice input at the network control device to produce a voice data signal, transmitting the voice data signal within the said signal to the sounder and/or loudspeaker devices, and outputting the voice data signal to the transducers of the respective devices.

Where a network device has a voice input means, the invention also provides a method comprising inputting a voice signal into that device, transmitting the voice signal within the said signal to the detector control apparatus and outputting the voice signal at the detector control apparatus.

BRIEF DESCRIPTION OF THE DRAWINGS

Embodiments of the invention will be described with reference to the accompanying drawings, in which.

DESCRIPTION OF THE PREFERRED EMBODIMENTS

Figure 1:
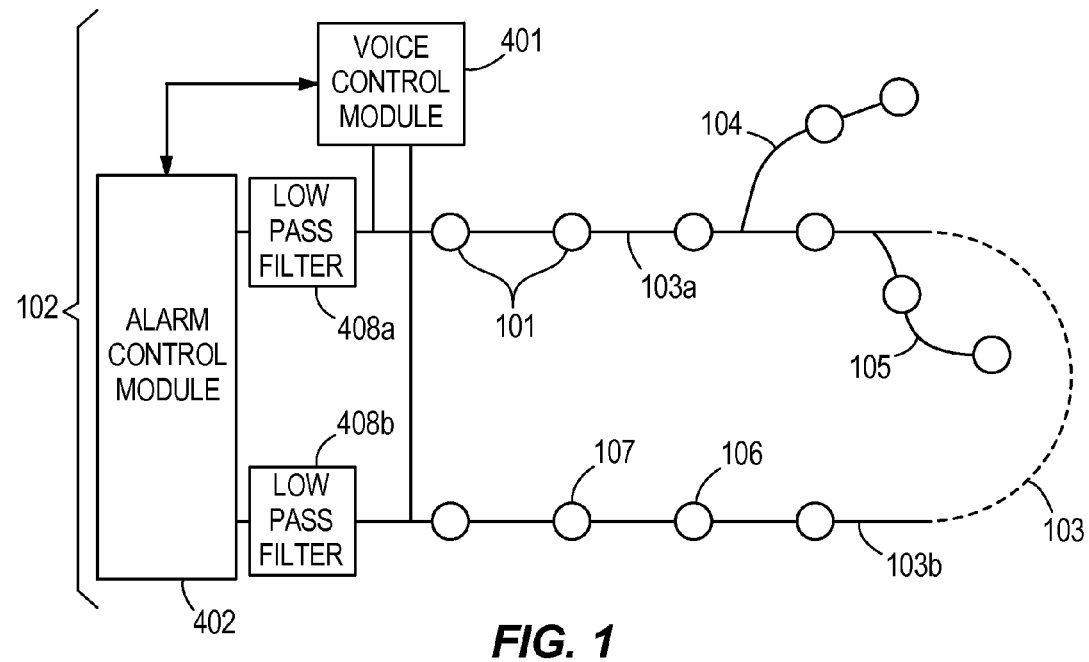
FIG. 1 is a diagram of a fire alarm system embodying the invention.

FIG. 1 shows a voice enhanced fire alarm system embodying the invention. The system comprises a detector control apparatus 102 connected to a databus network of detector apparatuses 101 linked by fire proof electric cabling. The cabling comprises a pair of wires, which allow power and information to flow in either direction. The network comprises a main loop structure 103, having two legs 103a and 103b. The network also has two spurs 104, 105. The fire alarm system of the preferred embodiment supports up to 1024 detector apparatuses on a network of 2 km of cabling. The invention is not limited to this number of detector apparatuses and length. Other devices as well as detector apparatuses may be present on the network 103, such as manual call points 106 and isolators 107.

Each detector apparatus 101 is located at a different strategic point around a building and may be located on a wall or ceiling of a room or corridor.

The detector control apparatus 102 is used to monitor the detector apparatuses 101 and also to transmit voice data to the detector apparatuses 101. The voice data may be messages either for storage by each detector apparatus 101 or for live broadcast by them.

Figure 2:
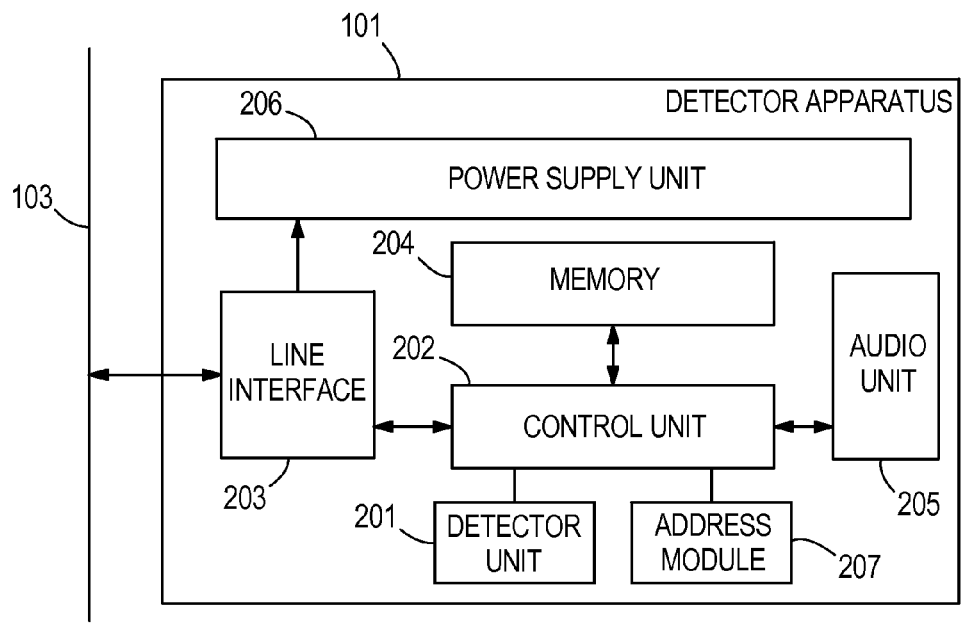
FIG. 2 is a diagram of a detector apparatus for use in the fire alarm system shown in FIG. 1.

FIG. 2 is a schematic diagram showing the layout of a detector apparatus 101. The detector apparatus 101 has a detector unit 201 having a portion exposed to the environment in which the detector apparatus 101 is located. The sensor portion can measure changes in the environment, such as the increase in temperature or in carbon monoxide associated with a fire or the decrease in optical transmissivity of infrared or visible light due to the presence of smoke. In another embodiment the detector unit 201 may be capable of detecting other conditions, for example the presence of gas, radiation or intruders.

The detector unit 201 is connected to a control unit 202, which receives signals from the detector unit 201 representative of the present state of the environment in which the detector apparatus 201 is located. The control unit 202 is also connected to a line interface 203 capable of transmitting and receiving signals to and from the network 103. The line interface 203 is arranged to transmit signals received from the control unit 202 to the network 103 and to transmit signals received from the network 103 to the control unit 202. The signals handled by the line interface 203 comprise control data and multimedia combined together, the details of which will be described below. The control unit 202 is further connected to a memory 204 for storing multimedia data files and the control unit 202 is capable of reading selected multimedia data files from the memory 204 and writing data files to the memory 204. The multimedia data files represent voice messages and the memory 204 is capable of storing eight voice messages, each message having a duration of 30 seconds, entailing a storage capacity for each message of the memory of 8 Mbits.

The control unit 202 is connected to an audio unit 205, which is arranged to receive control signals and voice data signals from the control unit 202. The voice data signals may be voice messages originating from the memory 204 or they may be live-streamed from the network 103 when the system is operating in a voice communication mode. The voice communication mode includes a public address (PA) mode whereby multiple detector apparatuses in the network may receive live-streamed voice data, and an intercom mode, where a communication channel is opened between selected detector apparatuses. The control data received from the network includes prioritisation information to indicate the output priority of the voice data received. Live-streamed voice data has a higher priority than pre-stored voice messages and will override voice messages being output. Voice messages will either be blocked in favour of the live-streamed voice data or both voice messages and live-streamed voice data will be output simultaneously, with the live-streamed voice data dominating.

The voice messages are stored in the memory 204 in digital form, for instance in WAV format. The control unit 202 has a digital to analogue converter for converting digital voice messages to an analogue signal prior to transmitting the voice messages, preferably in an uncompressed format for optimal signal-to-noise performance, to the audio unit 205.

Figure 3:
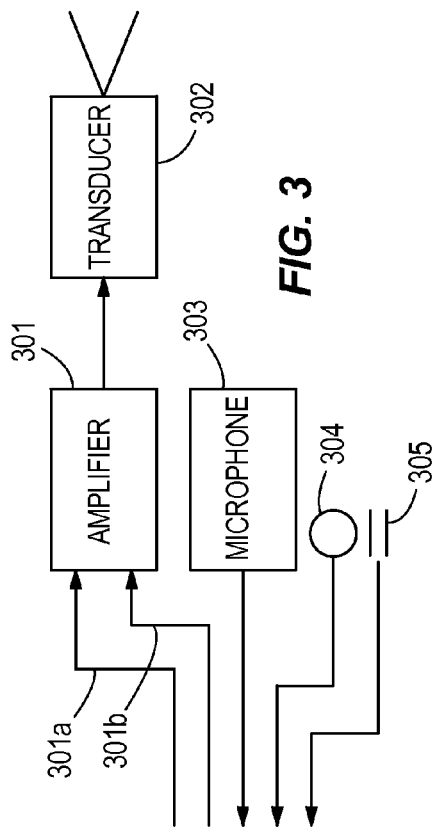
FIG. 3 is a diagram of an audio unit of the detector apparatus shown in FIG. 2.

The audio unit 205 is shown in detail in FIG. 3, and comprises an amplifier 301 and a transducer 302. The amplifier 301 is preferably of a Class D type in order to maximise efficiency: the output quality of voice messages is of secondary importance to efficient power use. The amplifier 303 is provided with a signal input 301a for receiving voice messages from the control unit 202 and a gain control input 301b for receiving gain control signals from the control unit 202. The transducer 304 is a loudspeaker of the piezo ceramic type in order to minimise power consumption. The sound pressure levels are preferably greater than 86 dBA at 1 meter. In another embodiment the transducer 304 is a screen or projector for reproducing video images, or may be a combination of screen, projector and loudspeaker.

The control unit 205 has a tone generator for generating a non-voice alarm signal, such as a siren, for output on the transducer 304.

The audio unit 205 includes a dynamic level control facility, whereby a microphone 303 is arranged to measure ambient sound levels between outputting voice messages. The measured sound levels are used by the control unit 202 to set a threshold value and to adjust the gain of the amplifier 301 to ensure that the audio output level is always a predetermined level, e.g. 20 to 50 dB above ambient threshold level, which is a requirement of BS5839-8:1998. In the fire alarm system power management on the network is important, especially during an alarm condition when most detector apparatuses will be drawing power. The technique of dynamic level control reduces the power consumed by detector apparatuses in locations where ambient noise levels are low, for instance in areas where evacuation is complete.

The control unit 202 is programmed to be operable in a test mode for use when the system is being tested, e.g. after installation. It generates appropriate fault messages, e.g. if the sounder output level cannot be cannot be made high enough, for local display and/or transmission to the detector control apparatus 102.

The audio unit 205 has a switch 304 operable by a user to indicate that the detector apparatus should operate in a voice communications mode. When in voice communications mode the audio unit 205 is arranged to receive the output signals from the microphone 303 and transmit the signals to the control unit 202. The control unit has an analogue to digital converter for digitising analogue voice signals. A socket 305 is provided for receiving voice signals from an external microphone or data storage device, by which voice signals can be input into the detector apparatus 101 as an alternative to the microphone 303.

The detector apparatus 101 has a power supply unit 206 for providing power to the components of the detector apparatus 101. Power is supplied to the detector apparatus 101 from the network. The detector apparatus 101 operates at 9 volts.

The detector apparatus 101 has an address module 207 where a unique address of the detector apparatus 101 is stored. The address module 207 comprises electro-mechanical means such as an address card of the type disclosed in European Patent number EP0362985. The address module 207 is arranged such that the control unit 202 is capable of recognising data signals received from the network 103 bearing the same address as that present in the address module 207. The address module 207 is further arranged such that the control unit 202 is capable of transmitting data signals conditioned to include the address in the address module 207. The structure of the data signals will be described in more detail below.

The detector apparatus 101 comprises two sections that may be separated. The first section is a base unit, which may be fixed to a surface such as a wall or ceiling in a building. The control means 202, the line interface 203, the memory 204, the audio unit 205 and the power supply unit 206 are provided in the base unit. The second section includes the detector unit 201 and is removably attached to the base unit by means such as a bayonet fitting. The detector unit 206 may be removed for replacement or for fitting an alternative type of detector unit 206.

Figure 4:
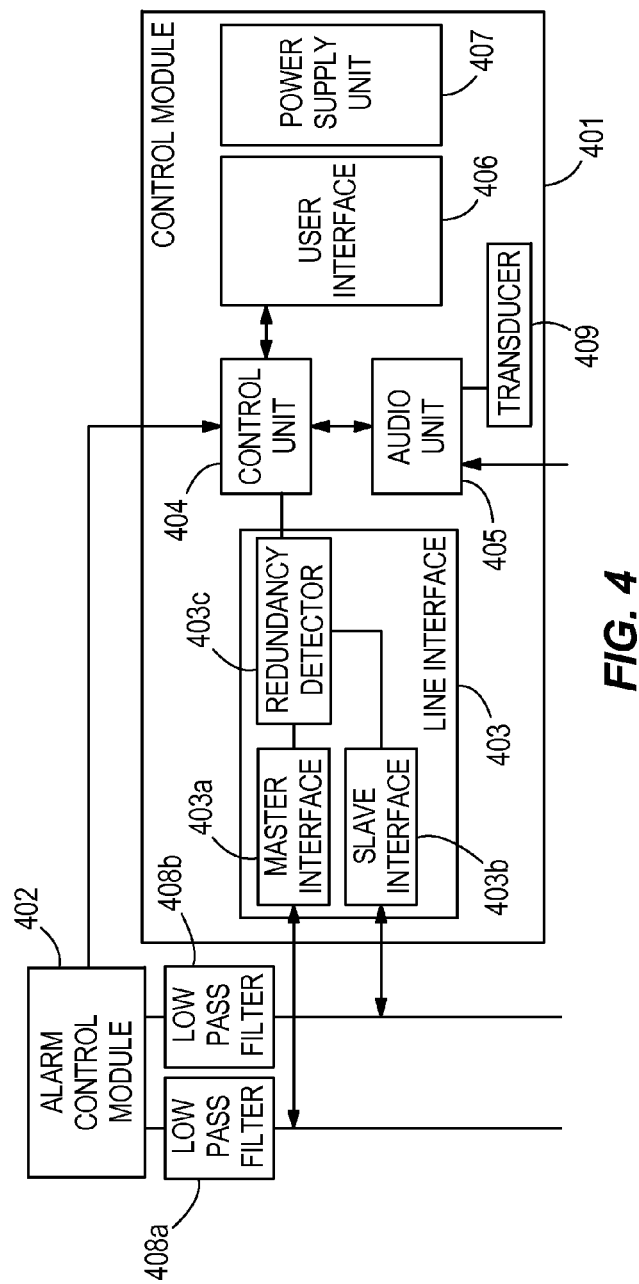
FIG. 4 is a diagram of a detector control apparatus for use in the fire alarm system shown in FIG. 1.

Detector control apparatus 102 is split into a voice control module 401 and an alarm control module 402, as shown in FIG. 4. The voice control module 401 monitors the voice network and controls the voice messages that are output by the detector apparatus 101. The alarm control module 402 monitors the network of detector apparatuses in order to determine the presence of an alarm condition, and determines the response of the voice control module 401 to such an event.

The voice control module 401 has a line interface 403 for transmitting data signals to the network 103, and receiving data signals from the network 103. The line interface is subdivided into a master interface 403a for transmitting and receiving data signals to and from a first leg of the loop 103a and a slave interface 403b for transmitting and receiving data signals to and from a second leg of the loop 103b. Under normal operating conditions, data signals are transmitted and received via the master interface 403a. The data signals received at the slave interface 403b are monitored by a redundancy detector 403c. In the event that data signals are no longer received from the master interface 403a at the slave interface 403b, the redundancy detector 403c is capable of switching the slave interface 403b to become a second master interface, and both transmit and receive data signals.

The line interface 403 is connected to a control unit 404 capable of transmitting data signals to the line interface 403 and receiving data signals from the line interface 403. The control unit 404 has a data link to the alarm control module 402. The control unit 404 is provided with standard protocol interfaces such as RS232, RS422/485, GPIO and Ethernet.

Figure 5:
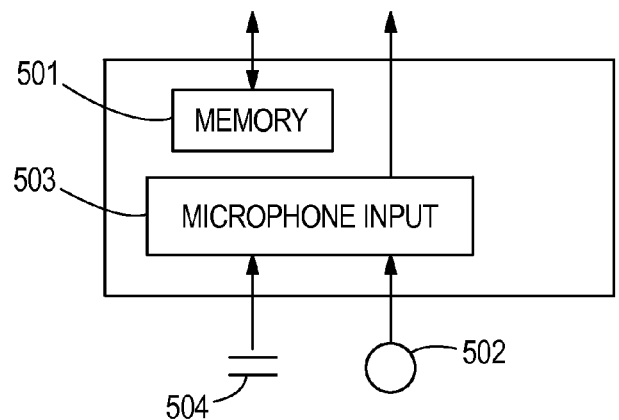
FIG. 5 is a diagram of an audio unit of the detector control apparatus shown in FIG. 4.

The control unit 404 is connected to an audio unit 405. The audio unit 405 has a microphone input 503 to enable the system to be used in voice communications mode. The audio unit 405 has a memory 501 as shown in FIG. 5. The memory 501 holds at least 32 concatenated voice messages of 16 bit resolution, sampled at 16 kHz, each of 30 seconds' duration. The minimum storage capacity for the memory 501 is therefore of the order of 32 Mbytes (8 Mbits per message). The control unit 404 is capable of reading voice messages from the memory 501 and transmitting voice message data and control data to the line interface 403. A microphone 502 and analogue to digital converter 503 are provided for direct voice input to the control unit 404 for use of the system in a voice communications mode. Alternatively, voice messages may be recorded and stored in the memory 501 for retrieval by the control unit 404 at a later time. A socket 504 is provided for the connection of an external microphone for direct voice input.

The control unit 404 has a further interface such as a USB port for loading pre-recorded voice messages into the memory 501.

The control unit 404 is connected to a user interface 406 comprising an LCD screen and user buttons. The user interface 406 may be used for selecting messages from the memory 501 for transmission to the network 103. A power supply unit 407 is also provided for providing power to the components of the voice control module 401.

The alarm control module 402 is of known structure, which will not be described in detail herein. The alarm control module is arranged to transmit polling signals to each of the detector apparatuses on the network. The structure of the polling signals will be described below. The alarm control module 402 is arranged to receive signals from all of the detector apparatuses on the network in order to ascertain the status of the detector apparatuses. If an alarm condition is detected the alarm control module 402 is arranged to communicate with the voice control module 401. The alarm control module 402 is isolated from the network 103 by low pass LC filters 408a and 408b, for reasons given below.

Figure 6:
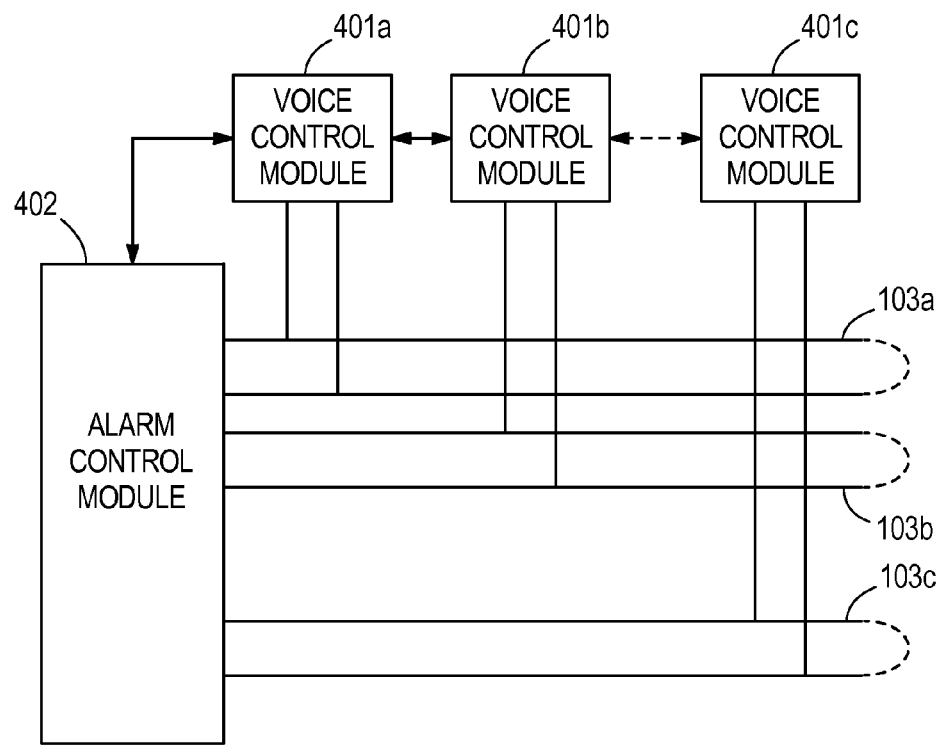
FIG. 6 is a diagram of an alternative fire alarm system embodying the invention, having a network comprising multiple loops and a single alarm control module.

A single alarm control module 402 may be provided with a number of loops 103a, 103b, 103c, as shown in FIG. 6. In this instance a voice control module 401a, 401b, 401c is provided for the control of voice messaging on each loop 103a, 103b, 103c.

Figure 7:
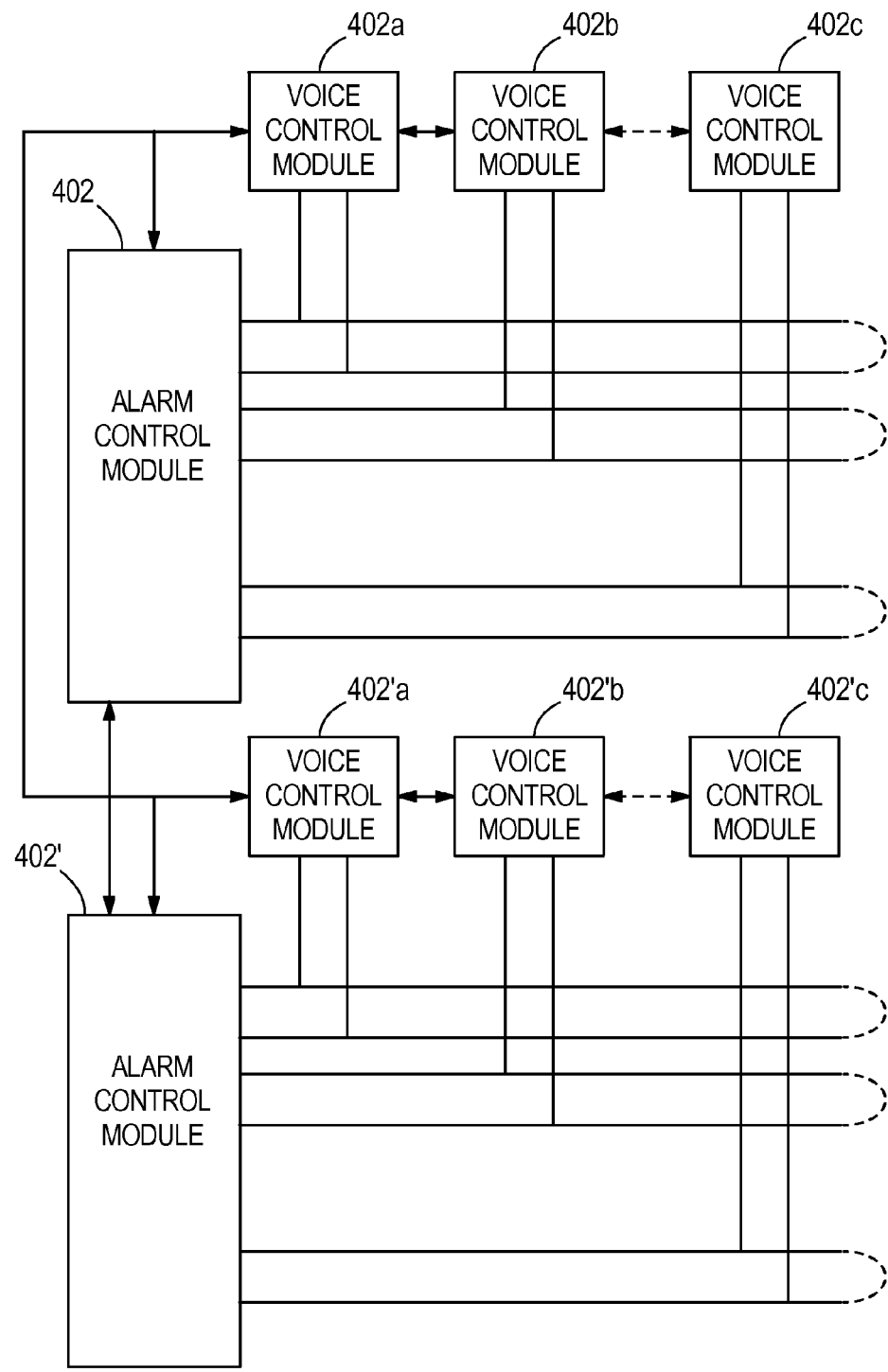
FIG. 7 is a diagram of a further alternative fire alarm system embodying the invention having a network comprising multiple loops and two alarm control modules.

FIG. 7 shows a further enhancement of the system where multiple alarm control modules 402, 402' are provided.

Figure 8:
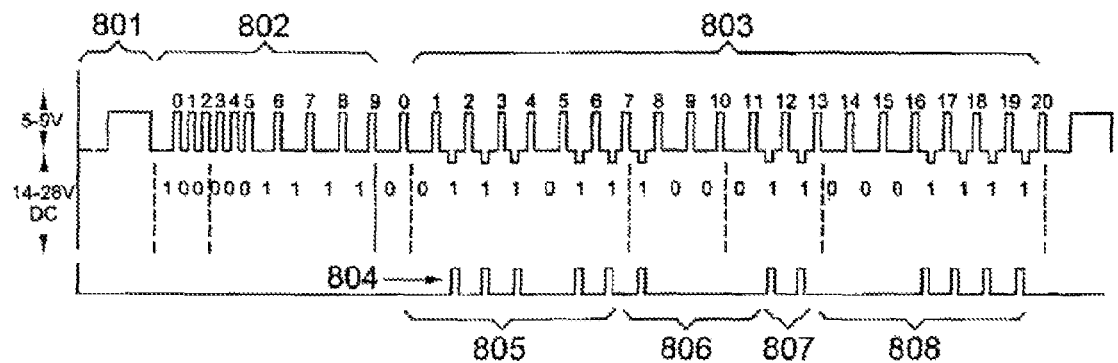
FIG. 8 is a diagram showing the data structure of a polling signal for use with the fire alarm system of any of FIGS. 1 to 7.

FIG. 8 illustrates the data structure for the polling signals transmitted by the alarm control module 402. The polling signals are consistent with the XP95 (registered trade mark) protocol, which is the digital open protocol of Apollo Fire Detectors Ltd. The alarm control module 402 provides a base voltage level of 14-28 volts to the line 103a, 103b, from which the detector apparatuses draw power. This base voltage varies within any installation depending upon the distance along the cable from the power source and other factors such as local cable quality and terminal connections. The base voltage is further modulated with an amplitude which is normally in the range of 5 to 9 volts. Polling data is sent in the form of frames of a specified duration. The first part of the frame is represented by a long duration voltage pulse 801, serving to reset the detector apparatuses. Pulse 801 is followed by a group 802 of ten bits in the form of positive going pulses whose mark-to-space ratio is varied according to the bit being transmitted. The first three bits of the ten bit group represent a command instruction, for instance to turn on an indicator in each of the detector apparatuses on the network. The next seven bits of the ten bit group represent an address of the detector apparatus to be polled. Following the ten bit sequence is a series 803 of twenty-one synchronising voltage pulses of constant mark-to-space ratio.

Upon receiving a data signal having a matching address to that encoded in the address field of the frame, a detector apparatus transmits a response consisting of twenty-one bits to the alarm control module 402, consisting of current pulses 804. The transmissions are thus bidirectional. The current pulses 804 cause corresponding voltage drops to occur, which are detected by the alarm control module 402. The twenty-one bit response from the detector apparatus is, in effect, a third transmission component of the signal on the databus, and it consists of seven bits of status information 805, where the value of the parameter measured by the detector unit 201 is reported. This is followed by command bits 806 and bits 807 indicating the type of device being polled. The seven bit address of the detector apparatus is confirmed back to the alarm control module 402 in section 808.

The pulsed voltage signal 801, 802 and 803 may be considered to be made up of positive-going rectangular pulses of varying width and separation, with a binary "1" value, the binary "0" value being the gaps between pulses. The pulse width may be in the range 100 µs to 4 ms, preferably 200 µs to 2 ms, more preferably 250 µs to 1.5 ms; the pulse gaps may be in similar ranges. In the example shown in FIG. 8, the first pulse 801 is 1.5 ms wide followed by an 800 µs gap before pulse "0" of group 802. the gaps between pulses "0" to "5" of group 802 are 200 µs. The gap between voltage pulse "1" of the series 803 and the negative-going pulse caused by the first current pulse 804 is 250 µs. The gap between pulses "4" and "5" in the series 803 is 1 ms. The gap between pulse "7" of series 803 and the next (sixth) negative-going pulse is 400 µs.

It will be appreciated that the pulses will not be perfectly rectangular, and that in practice they will be arcuate over the pulse transitions, to limit the effective frequency bandwidth. The pulses are slew-limited in the preferred example, to stabilise the systems that detect them and avoid overshooting.

Figure 9:
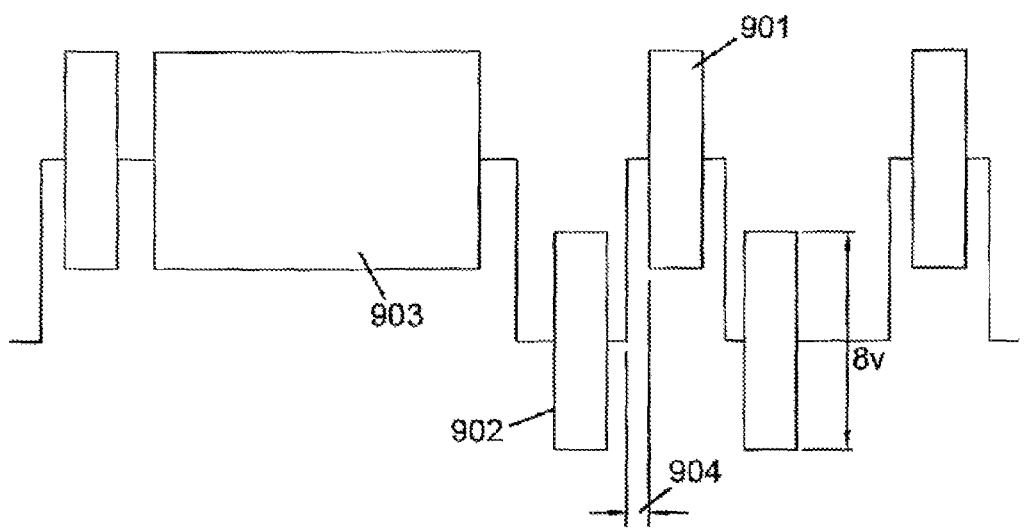
FIG. 9 is a diagram showing a carrier signal superimposed on the polling signal shown in FIG. 8.

FIG. 9 illustrates the structure of the data transmitted by the voice control module 401. The data signals are modulated onto the polling data transmitted by the alarm control module 402 using a quadrature phase scheme at a carrier frequency of 500 kHz. The alarm control module 402 may be affected by these high frequency signals, and therefore low pass filters 408a, 408b are used to isolate the alarm control module 402 from the carrier signals transmitted on the network 103 by the voice control module 401. The data signals from the voice control module 401 represent control data and multimedia data, and they have the same frame structure as that of the pulsed voltage signal. Multimedia data includes voice messages, live-streamed voice data or video data. The maximum peak-to-peak amplitude of the carrier signal is 8 volts. The carrier signal is transmitted on high 901 and low 902 voltage pulses of the polling signals, including the initiation pulse 903. The voice control module 401 is programmed to ensure that the carrier signal is not transmitted near the leading or trailing edges of the voltage pulses and that a clearance 904 is provided to avoid corruption of either the polling signals or the carrier signal. The carrier signal has a burst duration of 0.7 milliseconds on the long initiation pulse and a duration of 0.15 milliseconds on each bit of the frame. Thus there is an intelligently-selectable burst length for the carrier signal. In this example, the voice control module 401 detects the transitions of the voltage pulses 801-803, and it allows a long burst 903 within the first pulse 801 only if it has not detected a trailing edge of that pulse, i.e. only if it is satisfied that the pulse is a reset pulse of long duration.

Figure 10A:
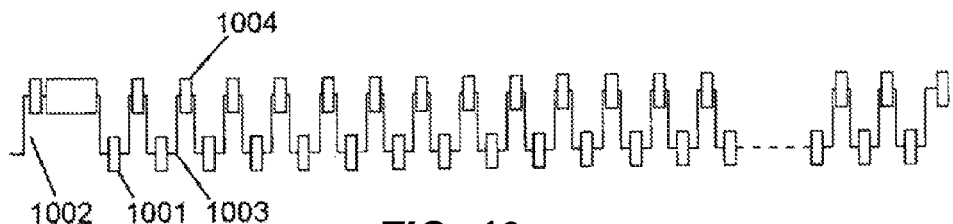
FIG. 10a is a diagram showing a carrier signal superimposed on the polling signal shown in FIG. 8 in accordance with a continuous burst mode.
Figure 10B:
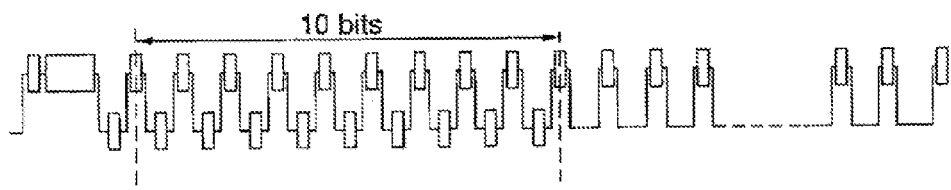
FIG. 10b is a diagram showing a carrier signal superimposed on the polling signal shown in FIG. 8 in accordance with an initiation burst mode.
Figure 10C:
FIG. 10c is a diagram showing a carrier signal superimposed on the polling signal shown in FIG. 8 in accordance with a zero burst mode.

Three carrier transmission modes are possible, illustrated respectively in FIGS. 10a to 10c.

The first mode is a continuous burst mode shown in FIG. 10a, where the carrier signals 1001 are transmitted on all initiation pulses 1002, and on low 1003 and high 1004 voltage pulses. It is possible to transmit 9340 bits per frame in this mode giving a data rate of around 420 Kb/s.

In some installations there may be a risk that the carrier signal interferes with the monitoring of the current pulses 804, which are in the second part of the XP95 signal frame for example. To reduce this risk, the second mode is an initiation burst mode as shown in FIG. 10b, where carrier signals are transmitted on all initiation pulses, on high and low voltage portions of the first ten bits of the frame and on only the high voltage peaks of the synchronisation bits in the remainder of the frame. It is possible to transmit 6600 bits per frame in this mode giving a maximum data rate of around 300 Kb/s.

In the unlikely event that the peaks of voltage in the carrier signal, added to the pulsed voltage signal and the base voltage, would exceed certain thresholds in system devices such as EMC, surge protection devices, this could be avoided by using a third mode. The third mode is a zeros burst mode as shown in FIG. 10c, where carrier signals are transmitted on all low voltage pulses only. In other circumstances, a "ones" mode may be envisaged where data is transmitted on high voltage pulses only. In the zeros burst mode it is possible to transmit 4352 bits per frame giving a maximum data rate of around 200 Kb/s.

Carrier signals are transmitted from the voice control module 401. These signals are termed uplink data. Carrier signals are transmitted from a detector apparatus or other network device to the voice control module 401. These signals are termed downlink data.

Figure 11:
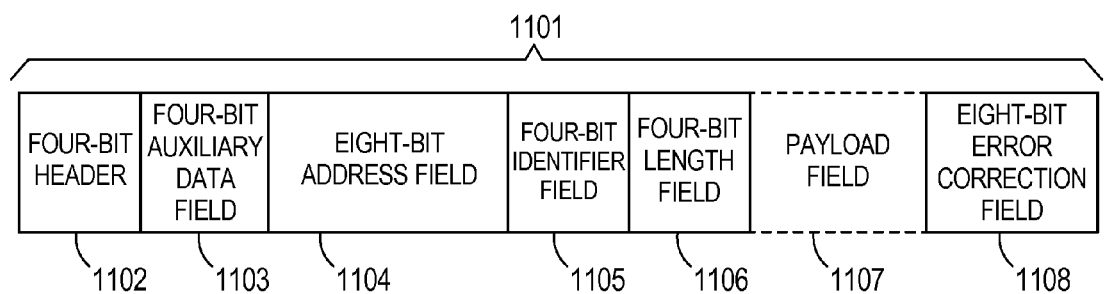
FIG. 11 shows the data structure of an uplink sub-frame, the uplink sub-frame being a portion of data carried by the carrier signal superimposed on the polling signals as shown in FIG. 9.

The structure of uplink data transmitted by the voice control module 401 is illustrated in FIG. 11. The uplink data is packaged in an uplink sub-frame 1101. Each uplink sub-frame contains a four-bit header 1102, indicating the position of the sub-frame in a sequence. A four-bit auxiliary data field 1103 is used to indicate whether an address field is for a single detector apparatus or a group. An eight-bit address field 1104 is provided in order to indicate the destination address of the data: a zero in this field is used to indicate that the data is intended for all detector apparatuses in the network. A four-bit identifier field 1105 indicates the type of data in payload field 1107, for example voice message, live-streamed voice data or video data. A four-bit length field 1106 indicates the size of the payload field 1107. The payload field 1107 can be up to 256 bits. An eight-bit error correction field is provided 1108.

The structure of the downlink sub-frame is the same as the uplink sub-frame.

Figure 12:
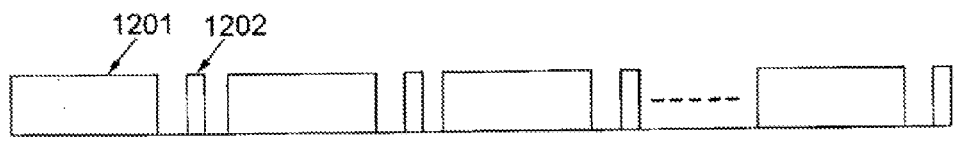
FIG. 12 shows the relationship between the uplink sub-frames, as shown in FIG. 11 and downlink sub-frames (not illustrated).

The relationship between uplink sub-frames 1201 and downlink sub-frames 1202 is shown in FIG. 12. After each uplink sub-frame transmission a downlink message is transmitted in response.

Operation of the fire alarm system will now be described. The fire alarm system is operable in a number of modes. The first mode is a steady state uploading of multimedia data to selected detector apparatuses, which is carried out while the system is actively monitoring for alarm conditions. Alternatively data upload is carried out while the system is offline. The operation of the system while the system is actively monitoring will be described below. The second mode of operation is in response to an alarm condition. The third mode of the system is as voice communications mode, which may be effected while the system is actively monitoring the status of detector apparatuses, or during an alarm condition. There are two sub-modes of voice communication: a public address (PA) mode and an intercom mode. Each mode and sub-mode will be described in turn below.

Data Uploading Mode

During operation of the fire alarm system the alarm control module 402 constantly transmits polling signals to all of the detector apparatuses 101 on the network 103. The detector apparatuses 103 respond with the appropriate signals as described above. The detector apparatuses 103 are provided pre-loaded with voice messages for broadcast in the event of an alarm condition. However, the pre-stored voice messages may be overwritten in order to customise the system for particular applications. In order to load a particular detector apparatus with voice messages a user selects voice messages to be uploaded from the memory 501 of the voice control module 401. Alternatively, if an appropriate message is not already stored in the memory 501, new voice messages may be loaded into the memory 501, either directly by the use of microphone 502 or indirectly by loading pre-stored messages from an external memory device such as a flash memory.

When the messages have been selected, the control unit 404 of the voice control module 401 reads the voice data from the memory 505 and transmits the data to the network 103 via the line interface 403. The voice message data is transmitted in the payload sections 1107 of a series of uplink sub-frames 1101, along with control data, including a destination address of the recipient detector apparatus 103 and control data relating to how the detector apparatus should handle the payload. In this data uploading mode the control data is an instruction to load the voice data to a memory 204 of the detector apparatus. Further control data transmitted with the voice message data provides voice message identifier, so that the voice message can be retrieved from the memory 501 of the detector apparatus 101 by transmitting the voice message identifier alone to the detector apparatus 101. Yet further data transmitted with the voice message provides a voice message priority level.

Each detector apparatus 101 in the network will receive the voice message data. Each detector apparatus 101 will only process the data if the address in the address module 207 of the detector matches that in the address field of the uplink sub-frame. Each detector apparatus 101 will process the data if the address in the uplink sub-frame is a zero, indicating a message is intended for all detector apparatuses 101 in the network 103.

Upon receipt of an uplink sub-frame control unit 204 of the detector apparatus extracts the payload and writes the voice message to the memory 202, with a corresponding voice message identifier and a priority level. The detector apparatus 101 may transmit a downlink sub-frame to the voice control module 401 in order to confirm that the voice message has been successfully stored to memory 501.

Alarm Condition

When a detector unit 201 in a detector apparatus 101 detects an alarm condition, e.g. smoke or fire, an alarm signal is transmitted by the detector apparatus 101 to the alarm control module 402. This signal need not be delayed until the detector unit 201 is polled. An alarm signal may also be raised from a manual call point 106 in the network. The alarm control module 402 will identify the location of the originating alarm signal in the network and establish a suitable response to raise the alarm around the network. The alarm control module 402 transmits instructions to the voice control module 401 indicating the location of the detector apparatus where an alarm condition has been detected. The voice control module 401 then transmits an alarm control signal to the detector apparatuses 101. The alarm control signal contains a voice message identifier in order to identify a message in the memory 204 of the detector apparatus 101 to be output to the transducer 302. Alternatively the alarm control signal indicates that a tone should be generated by the tone generator.

Voice Communications

The fire alarm system is capable of broadcasting voice data from the voice control module 401 to all detector apparatuses or other devices in the network, and from a single detector apparatus 101 or other device to all other network devices. This is termed a public address (PA) mode. The fire alarm system is also capable of transmitting and receiving voice signals between an individual detector apparatus 101 or a separate intercom device or call point, and either the voice control module 401, another individual detector apparatus 101, or another intercom device or call point. This is termed an intercom mode. Both of these sub-modes of the voice communications mode are described below.

Public Address Mode—Voice Control Module to Networked devices

The microphone 502 provided at the voice control module 401 is used to input voice data. This data is digitised and prepared by the control unit 404 for transmission on the network 103. The voice data itself is transmitted as a payload in a series of uplink sub-frames, which also contain control data identifying a group of detector apparatuses or all of the detector apparatuses or other devices with sound transmission functionality on the network. Each recipient device identifies from the control data that the payload is live-streamed voice data and transmits it directly to the audio unit 205 to be output on the transducer 302. A priority level of 1 is included in the control data indicating that the incoming voice data should be output in preference to any recorded messages that are currently being output by the transducer 302.

Public Address Mode—Networked Device to Networked Device

Microphone 303 on the networked device such as the detector apparatus 101 is used to input voice signals. The voice communications switch 304 on the detector apparatus 101 is activated to indicate to the control unit 202 of the detector apparatus 101 that the microphone is to be used for voice input. Voice signals are received by the audio unit 205 and transmitted to the control unit 202 and prepared for transmission to the network 103. The voice signals are packaged into the payload sections of a series of downlink sub-frames along with control data. The downlink sub-frames are transmitted to the network and received by the voice control module 401, and forwarded to recipient detector apparatuses. Each recipient detector apparatus identifies from the control data that the payload is live-streamed voice data and transmits it directly to the audio unit 205 to be output on the transducer 302. A priority level of 1 is included in the control data indicating that the incoming voice data should be output in preference to any recorded messages that are currently being output by the transducer 302.

The fire alarm system may be used in PA mode during an alarm condition to broadcast evacuation warnings, for instance. It may also be used during non-alarm conditions to broadcast general announcements or music.

Intercom Mode

An intercom voice communication function may be required by firefighters and/or in disabled people's refuge areas in buildings.

The user interface 406 of the voice control module 401 is used to select a recipient detector apparatus 101. The microphone 502 provided at the voice control module 401 is used to input voice data. This data is digitised and prepared by the control unit 404 for transmission on the network 103. The voice data itself is transmitted as payload in a series of uplink sub-frames, which also contain control data identifying the recipient detector apparatus. The recipient detector apparatus identifies from the control data that the payload is live-streamed voice data and transmits it directly to the audio unit 205 to be output on the transducer 302. Further control data indicates to the control unit 202 of the recipient detector apparatus that an intercom mode is selected. The control unit monitors the output of the detector apparatus microphone 304 for voice signals and transmits voice signals to the voice control module 401. A transducer 409 is provided at the voice control module for outputting voice signals received from the detector apparatus 101. In this way a two-way communication channel between the voice control module 401 and a detector apparatus 101 is provided. Alternatively a two-way communication channel between two detector apparatuses may be provided, whereby a detector apparatus 101 initiates communication between itself and another detector apparatus.

The detector apparatus microphone 304 may be bypassed, whereby socket 305 may be used by a fire-fighter to connect a personal communications device such as a headset, including a microphone and headphones, e.g. by a plug and socket. Alternatively, the interface for the fire-fighter could be a separate intercom call point, which may have a microphone or only an electronic terminal for a plug or socket.

The provision of a high speed digital data carrier to the fire alarm system allows the integration of a number of features into the system. Use of control data integrated with multimedia data allows a flexible approach to functionality. Data signals may be directed to any location around the network to elicit a variety of responses. For instance, individual detector apparatuses or groups of detector apparatuses can receive instructions to output different messages to other individual detector apparatuses or groups of detector apparatuses. This is useful when an "evacuate" message is required in one area of a building, while a "standby to evacuate" message is required in another area of a building, while a fire-fighter's PA is required in still another area of the building.

The voice control module 401 is retro-fitted to fire alarm systems such as those complying with the Apollo XP95 protocol having an existing alarm control module 402 for polling and controlling detector apparatuses. Modified base units are fitted in order to take advantage of the high speed data carrier system. Existing detector units are fitted to the modified base units.

Alternatively an entire system including an alarm control panel is installed at the same time. The voice control module and the alarm control module may be integrated in the same housing.

It will be appreciated that any type of multimedia data may be stored in the voice control module memory 501 or the detector apparatus memory 204, including data representing video images. It will also be appreciated that any size memory may be utilised in order to store the multimedia data.

In the embodiment described above, the network signal has a power component, from its base voltage, in addition to the information-conveying components, and the detector apparatuses draw power from the network 103. Alternatively a separate local supply is also provided, in which instance the detector apparatus 101 is preferably arranged to operate at 24 volts.

The detector apparatus 101 can also act as a signal repeater in the network, in order to boost data signals. In this way the network may be expanded indefinitely, provided a local power supply is used for the detector apparatuses.

The address module 207 of the detector apparatus 101 may be an electronic identification means stored in a memory of the detector apparatus 101.

Voice control module voice input socket 504 and detector apparatus voice input socket 305 may be used by fire-fighters as inputs for their own voice signal generating equipment.

The network may be in the form of a line terminating at a single interface at the alarm control module 402, with detector apparatuses connected in series along the line.

As an alternative to one or more of the detector apparatuses as described above, sounder units may be provided for operation in the fire alarm system, including all of the voice communications functionality of the detector apparatuses described above, but without a detecting means. Other apparatuses may be provided for connection to the network, which transmit and receive data using a carrier superimposed upon a polling signal, such as sounder units and detector units without a voice communication function.

The carrier signal has a frequency of approximately 500 kHz in the embodiments described above. However, the carrier frequency is not limited to this value, and may be any frequency in the range 200 kHz to 800 kHz. The system will also function with a carrier signal frequency in the range 100 kHz to 1 MHz, and at frequencies outside of this range, such as up to 10 MHz.

The rate of data transfer may vary within the range 1,000 to 100,000 bits per frame, or 100 to 1000 Kb/s, but may also fall outside of these ranges.

In some embodiments, two or several different carriers may be transmitted simultaneously in the same signal, to increase data capacity.

The network described above is a databus network, on which the devices are uniquely addressable, but it is envisaged that the invention could also be applied to point-to-point systems such as are used in telephony. The network could be for unidirectional signals instead of the bidirectional flow of the preferred embodiments.

Further, the XP95 protocol described in the preferred embodiment with reference to FIG. 8 is not essential, and the invention could be applied to many alternative protocols, digital and analog. The pulsed voltage signal could represent analog data by varying pulse height or pulse width or both in accordance with earlier, non-digital protocols used in fire detection systems for example. The invention could be applied to the well-known RS232 standard for series communications; RS232 uses fixed width cells and involves a binary-coded digital signal.

The higher frequency modulation of the pulsed voltage signal could be used to convey any type of information, and it is not limited to multimedia content or commands for controlling and addressing electronic devices. It could convey any data such as are typically sent over computer or telephone networks.

The voice control module 401 could have a self-learning program, which detects the structure of each frame of the pulsed voltage signal and thus the protocol in use on the network. It could then learn that protocol and adapt the carrier signal timing accordingly.

The functions of the detectors 101 described above need not all be provided in every detector or in any detector. The detector may not have the sounder or loudspeaker functions nor the ability to store multimedia files. Instead, the network may have separate loudspeaker devices, which are uniquely addressable and which have the multimedia functions described, e.g. for selecting voice messages and transducing them to sound emitted from a loudspeaker. There may also be sounder devices which emit alarm sounds or other tones but not speech, and which are also uniquely addressable. The detectors 101 need not have intercom functionality such as a microphone, as this could be provided in a separate intercom device or a call point on the network.

In the application of the invention to intruder alarm or CCTV monitoring systems, the multimedia signal component and multimedia files would comprise video, and the system could include video display devices for video content.

The invention claimed is:

1. A wired network interconnecting electronic devices, the electronic devices being configured to transmit and/ or receive a signal comprising: a base voltage for conveying power to the electronic devices; a pulsed voltage signal bearing coded information for transfer between the electronic devices; and a digital signal superimposed onto selected portions of the pulsed voltage signal, wherein the digital signal comprises a carrier signal with a frequency substantially greater than that of the pulsed voltage signal, the carrier signal being modulated by a data signal for transfer of the data signal between the electronic devices; the wired network including:
a network control device having a interface arranged to transmit the said signal containing the data signal on the network to the electronic devices on the network, the network comprising a databus in which each electronic device is uniquely addressable digitally;
wherein the databus has a first termination and a second termination connected respectively to the network control device at a first interface and a second interface to form a loop; and
wherein the network control device is arranged to transmit the said signal from the first interface, to monitor the said signal received at the second interface, and to transmit the said signal from the second interface if it detects that the said signal has not been received at the second interface from the first interface.

2. The wired network according to claim 1, wherein the carrier signal has a frequency in a range 100 kHz to 10 MHz.

3. The wired network according to claim 1, wherein a data rate of the data signal is in a range of 100 to 1000 Kb/s.

4. The wired network according to claim 1, wherein pulse widths of the pulsed voltage signal are in a range of 100 μs to 4 ms.

5. The wired network according to claim 1, wherein the coded information in the pulsed voltage signal comprises an address of one of the electronic devices or of a group of the electronic devices and data for that device or for that group of devices.

6. The wired network according to claim 1, wherein the data signal of the digital signal comprises audio content.

7. The wired network of claim 1, further comprising: a non-transitory computer-readable medium storing a computer program which, when loaded in at least one of the electronic devices, causes that device to generate or to process the signal.

8. The wired network of claim 1, wherein at least one of the electronic devices comprises means for generating and/or for processing the signal, and means for drawing power from that signal.

9. The wired network according to claim 1, wherein the wired network comprises a fire detection network, at least one of the electronic devices being one or more of a sounder, a loudspeaker, a fire detector, and a voice communications terminal.

10. The wired network according to claim 1, wherein at least one of the electronic devices comprises a transducer arranged to generate an audio output from audio content, the electronic device being configured to receive the signal to obtain the audio content of its data signal and to transmit the audio content to the transducer, so as to output the audio content to the transducer upon receipt of it form the signal and thereby to generate the audio output in real time.

11. The wired network according to claim 1, further comprising a voice communications terminal configured for communication over a wired network and configured to output the signal, the terminal comprising voice input means and an analog-to-digital converter arranged to digitize electronic signals from the voice input means and to transmit the digitized voice signals in the said signal as part of the said data signal.

12. A method of operating a network according to claim 1, wherein the network control device receives a voice input and uses the voice input to produce a voice data signal as the data signal of the said signal, wherein at least one of the electronic devices includes a sounder and/or loudspeaker to which the network control device transmits the voice data signal within the said signal, and wherein the voice data signal is output to transducers of the respective devices.

* * * * *